(12) United States Patent
Halliday et al.

(10) Patent No.: US 11,062,146 B2
(45) Date of Patent: Jul. 13, 2021

(54) MAINTENANCE OF PLAYING SURFACES

(71) Applicant: INTELLIGENT PLAY LTD, Nottinghamshire (GB)

(72) Inventors: Derek Halliday, Edinburgh (GB); Gordon Halliday, Edinburgh (GB); Alexander Talton, Sutton-in-Ashfield (GB)

(73) Assignee: INTELLIGENT PLAY LIMITED, Kirkby In Ashfield (GB)

( * ) Notice: Subject to any disclaimer, the term of this patent is extended or adjusted under 35 U.S.C. 154(b) by 0 days.

(21) Appl. No.: 16/642,538

(22) PCT Filed: Aug. 21, 2018

(86) PCT No.: PCT/GB2018/052363
§ 371 (c)(1),
(2) Date: Feb. 27, 2020

(87) PCT Pub. No.: WO2019/043357
PCT Pub. Date: Mar. 7, 2019

(65) Prior Publication Data
US 2021/0073553 A1    Mar. 11, 2021

(30) Foreign Application Priority Data
Sep. 1, 2017    (GB) ..................... 1714056

(51) Int. Cl.
*G06K 9/00*        (2006.01)
*G06T 7/70*        (2017.01)
(Continued)

(52) U.S. Cl.
CPC .......... *G06K 9/00771* (2013.01); *A63B 71/02* (2013.01); *G06K 9/6256* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 4,769,700 A | * | 9/1988 | Pryor .................. | A01B 69/008 348/120 |
| 5,341,540 A | * | 8/1994 | Soupert .............. | A47L 11/4011 15/319 |

(Continued)

FOREIGN PATENT DOCUMENTS

| | | | |
|---|---|---|---|
| ES | 2 165 783 A1 | 3/2002 | |
| JP | 2018156201 | * 10/2018 | ............. G06Q 10/00 |
| WO | 2006/027627 A1 | 3/2006 | |

OTHER PUBLICATIONS

International Search Report for corresponding International Application No. PCT/GB2018/052363 dated Jan. 30, 2019.

(Continued)

*Primary Examiner* — Zhiyu Lu
(74) *Attorney, Agent, or Firm* — Pearne & Gordon LLP

(57) ABSTRACT

A playing surface monitoring system, comprising a playing surface; an image capture unit arranged for capturing images of at least part of the playing surface and persons or objects thereon; processing means for detecting said persons or objects and their relative location on the playing surface; means for discriminating between persons using the pitch and objects used for maintenance of the playing surface, and means for using the determined information for determining density of use and/or maintenance of the playing surface or one more parts thereof over a period of time.

15 Claims, 11 Drawing Sheets

(51) Int. Cl.
*G06N 20/00* (2019.01)
*A63B 71/02* (2006.01)
*G06K 9/62* (2006.01)
*G06T 7/00* (2017.01)
*E01C 11/00* (2006.01)

(52) U.S. Cl.
CPC ........... *G06K 9/6267* (2013.01); *G06N 20/00* (2019.01); *G06T 7/0002* (2013.01); *G06T 7/70* (2017.01); *A63B 2225/30* (2013.01); *E01C 11/00* (2013.01); *G06T 2207/20081* (2013.01); *G06T 2207/20084* (2013.01); *G06T 2207/30196* (2013.01); *G06T 2207/30228* (2013.01)

(56) References Cited

U.S. PATENT DOCUMENTS

| | | | | |
|---|---|---|---|---|
| 8,359,907 B2* | 1/2013 | Lodge | ............. | G01B 5/28 73/105 |
| 9,265,204 B2* | 2/2016 | Younis | ............. | A01G 25/165 |
| 10,094,077 B1* | 10/2018 | Santoiemma | ............. | E01C 23/121 |
| 2005/0038578 A1* | 2/2005 | McMurtry | ............. | A01D 34/008 701/25 |
| 2008/0021651 A1* | 1/2008 | Seeley | ............. | A63B 24/0021 702/3 |
| 2010/0132442 A1* | 6/2010 | Lodge | ............. | G01B 5/28 73/105 |
| 2013/0153673 A1* | 6/2013 | Younis | ............. | A01G 25/16 239/1 |
| 2013/0305156 A1* | 11/2013 | Hohteri | ............. | G06F 3/04842 715/719 |
| 2016/0174459 A1* | 6/2016 | Balutis | ............. | G05D 1/0234 701/25 |
| 2017/0154222 A1* | 6/2017 | Zakaluk | ............. | H04N 21/8133 |
| 2017/0169315 A1* | 6/2017 | Vaca Castano | ............. | G06K 9/6814 |

OTHER PUBLICATIONS

Written Opinion for corresponding International Application No. PCT/GB2018/052363 dated Jan. 30, 2019.

British Combined Search and Examination Report dated Nov. 2, 2017 for corresponding British Application No. GB1714056.7.

Michael Beetz et al., "ASPOGAMO: Automated Sports Game Analysis Models", Sep. 30, 2009, XP055521968; Retrieved from the Internet on Nov. 7, 2018: URL: https://ias.in.tum.de/_media/spezial/bib/beetz091jcss.pdf; pp. 3, 6, 8 and 12.

Alastair Cox Associated Ltd: "The Smart Guide to Maintaining Synthetic Sports Turf (Long Pile)", Mar. 19, 2015, XP055522079, Retrieved from the Internet on Nov. 8, 2018: URL: http://www.rugbyaustralia.com.au/Portals/33/Artificial%20Turf/Smart%20Guide%20to%20Maintaining%20%20Synthetic%20Turf%20(Long%20Pile)%20electronic%20copy.pdf; pp. 7, 8, 11, 12.

* cited by examiner

US 11,062,146 B2

MAINTENANCE OF PLAYING SURFACES

FIELD OF THE INVENTION

This invention relates to the maintenance of playing surfaces. In particular it relates to monitoring use and maintenance of playing surfaces such as sport pitches, in particular but not exclusively, artificial pitches, in order to determine information relating to use of the pitch, to ascertain that maintenance is being properly performed and to determine data representative of utilisation of playing surfaces.

BACKGROUND OF THE INVENTION

Sports pitches, such as football, hockey or rugby pitches, can be utilised at very different rates throughout the day, week, month or season. In addition, it is very important, particularly with pitches, that the surface is correctly maintained. Whilst the condition of grass pitches can often be determining by a simple visual inspection, indicating that the grass needs cutting or that patches are forming or areas are being worn more than others, this is more difficult to do on artificial pitches. However, artificial pitches require careful maintenance and generally a condition of warranty is that a pitch must be maintained after a predetermined amount of wear has taken place.

In addition, owners and managers of sport facilities wish to optimise use of their pitches and playing surfaces, particularly where they have several playing surfaces or pitches. There is a need to monitor the use of such pitches and surfaces, how they vary throughout the day, week, season etc and also whether some pitches are used more than others at certain times so as to balance out use of the pitches.

Present methods of determining whether a pitch is being maintained properly, the degree of wear of a pitch and monitoring use of a pitch or series of pitches tends to rely solely on making records of numbers of people entering or using a facility itself, rather than monitoring specific pitches, playing surfaces or indeed specific areas of pitches, since some areas may require greater maintenance than others if that area of the pitch is used more than other areas. Current methods for doing this are inaccurate. Providers of pitch surfaces, particularly artificial pitch surfaces, also need to more accurately determine the use to which a pitch has been made in order to make sure that a warranty has not been breached.

BRIEF SUMMARY OF THE INVENTION

The present invention arose in an attempt to provide an improved method of monitoring the use and maintenance of sport pitches.

According to the present invention in a first aspect there is provided a playing surface monitoring system, comprising a playing surface; an image capture unit arranged for capturing images of at least part of the playing surface and persons or objects thereon; processing means for detecting said persons or objects and their relative location on the playing surface; means for discriminating between persons using the pitch and objects used for maintenance of the playing surface, and means for using the determined information for determining density of use and/or maintenance of the playing surface or one more parts thereof over a period of time.

Preferably, the device includes means for discriminating between a user using the pitch and a maintenance operation being performed upon the pitch to thereby determine whether the playing surface is being correctly maintained.

Most preferably, the image captor unit is a camera comprising means for capturing a pixel image of persons or other devices in one or more predetermined areas of the playing surface, means for identifying and classifying the/or each object within the image via a neural network process using the pixel data to generate an object type, determining a location coordinate for the/or each object type; and creating an array of object type and location coordinates over time to thereby monitor use and/or maintenance of the/or monitor part of the playing surface over time.

Preferably, the system also comprises a communications unit for communicating the array of object type and location coordinates with an end user.

Two or more image captor units may be arranged to monitor a playing surface or a plurality of playing surfaces.

The system may include means for providing data from each image capture unit to a remote monitoring station.

The remote monitoring station may comprise a dashboard type arrangement by which a user can monitor use of a plurality of playing surfaces.

In a second aspect the invention provides a method of monitoring use and maintenance of a playing surface, comprising providing a system as above, and using the monitored information representative of density of use and maintenance to monitor use and maintenance of the playing surface over a period of time.

BRIEF DESCRIPTION OF THE DRAWINGS

The embodiments of the invention will now be described, by way of example only, with reference to the accompanying drawings in which.

DESCRIPTION OF EXAMPLE EMBODIMENTS

Figure 1:
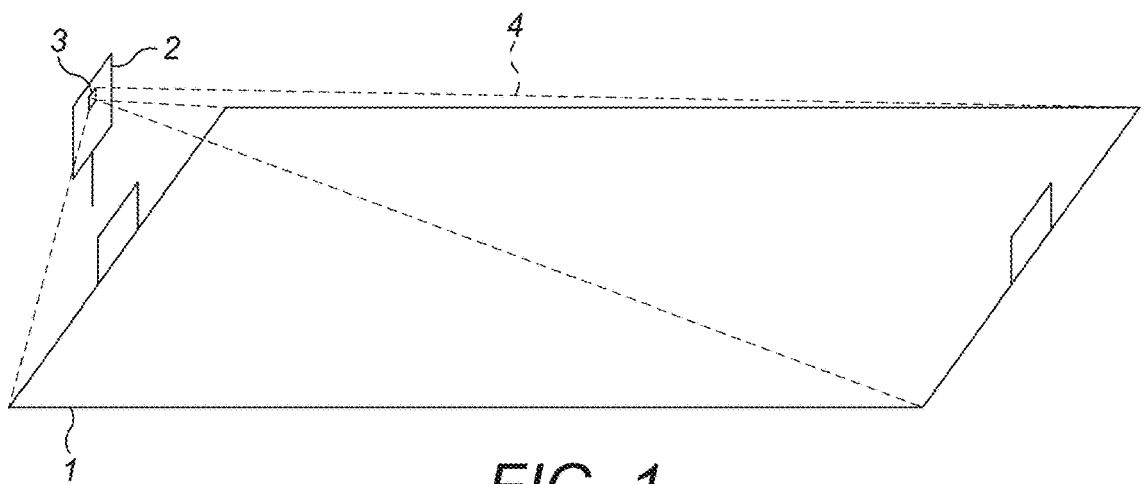
FIG. 1 shows a sport pitch with a camera mounted on a floodlight array.

Referring to the drawings, FIG. 1 shows a playing surface in the form of a football pitch. However, the invention is applicable to other types of playing surfaces or pitches, such as rugby pitches, hockey pitches, any of which may be turfed, of artificial turf or any artificial surface.

Mounted at the end of pitch 1 is a floodlight array 2 and a camera (or other image sensing means) is mounted on this floodlight array. The floodlight array provides a convenient support to locate a camera relatively high up but the camera or the image sensor may of course be mounted independently of any floodlight array, in a separate support or mast, in a grandstand or anywhere else where it can view and obtain an image of at least part of the pitch 1. The camera 3 is, in this example, able to image the whole of the pitch (dash lines 4 indicating schematically a field of view).

Figure 2:
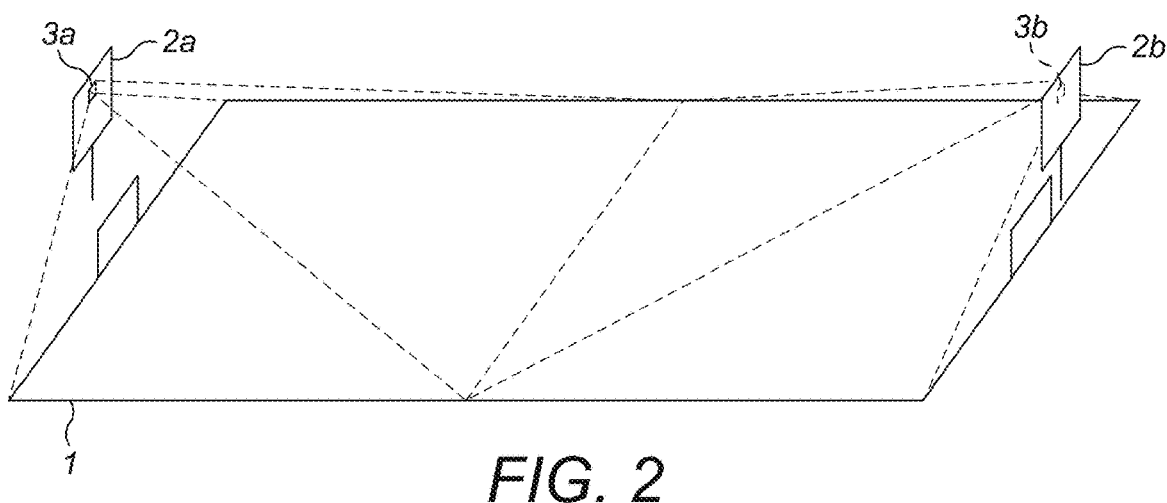
FIG. 2 shows a sport pitch having two cameras mounted on floodlight arrays.

FIG. 2 shows an example where two floodlight arrays 2a and 2b are provided at opposing ends of the pitch 1 and separate cameras 3a and 3b are provided on each floodlight array, each being used to monitor about half the pitch.

Figure 3:
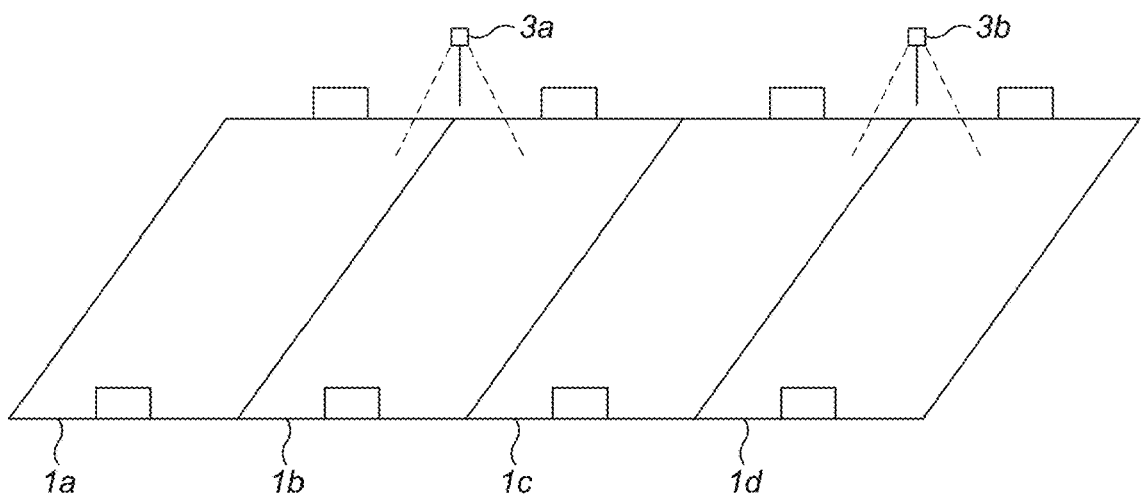
FIG. 3 shows a number of pitches with floodlight array mounted cameras.

In many embodiments, a plurality of pitches or playing surfaces may be monitored, for example, a local authority may own or manage a region having a number of pitches and may desire to know the respective use of these and the maintenance being correctly done on each of them. FIG. 3 shows an embodiment in which four pitches, 1A, 1B, 1C and 1D are provided in a row and a plurality of cameras 3a and 3b are provided, although two are shown as an example it will be appreciated that any number may be provided. Each camera may be located approximately midway along the width of a pitch and may be mounted, as shown, or many other configurations may be used. Cameras may be provided at both ends as opposed to only be provided at a single end as shown in the drawings.

The or each camera at a specific location (ie associated with a pitch or group of pitches) may be used and monitored locally, or each camera or group of cameras may be connected, via the internet for example, to a remote sensing station which can be anywhere in the world and which can be used to monitor a number of pitches and pitch systems, perhaps for several different clients.

In embodiments, images from the/or each camera (or other image sensor) are used and described in more detail below, to determine use of a playing surface by detecting players using the surface and monitoring use of parts of the surface over time, so as to obtain a measurement of the density of use of the surface or a region or regions of the surface. It may also be used to monitor that maintenance is being correctly done.

Figure 4:
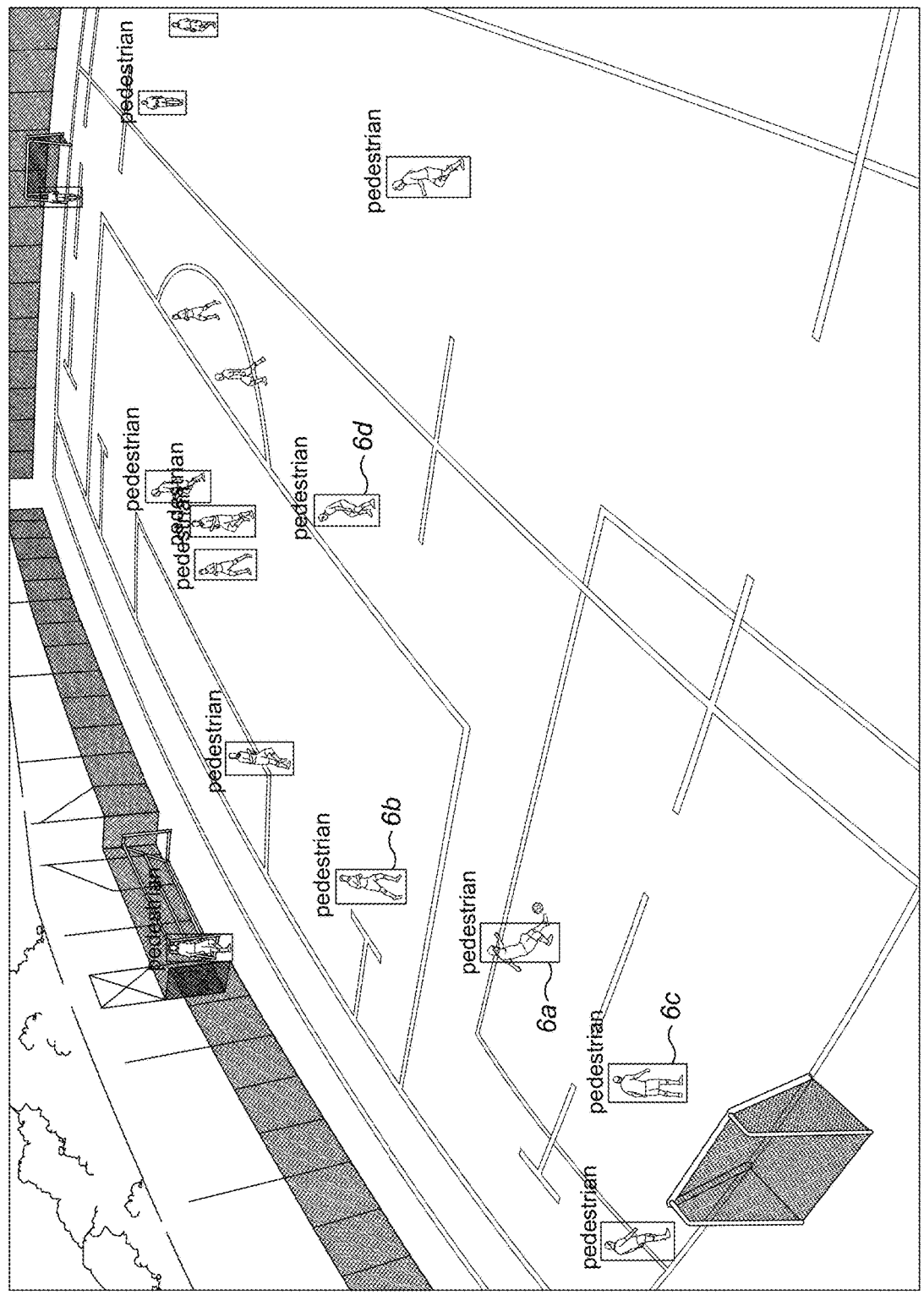
FIG. 4 shows an image of how users playing on a pitch are detected.

FIG. 4 shows a stage in the process and shows an image from a camera, (such as camera 3b in FIG. 3) in a situation with a number of players are using a pitch. The system can identify individual players by using algorithms and image processing technique, together with their location at any point and therefore can build up a density map of use of any monitored part of the surface at any time. By density is meant the number of people who pass over that part of the pitch in a predetermined period of time (say 15 minutes). This can therefore provide an indication of the use and therefore wear of the pitch.

The Figure shows a number of players 6a to 6d, which have been identified by the system as players, typically by virtue of determining a pattern of pixels which is considered to relate, in combination, to a player. Note that players themselves are not specifically individually tracked or identified in preferred embodiments of the system, which is only interested in monitoring use and not in monitoring the activities of individual players.

Figure 5:
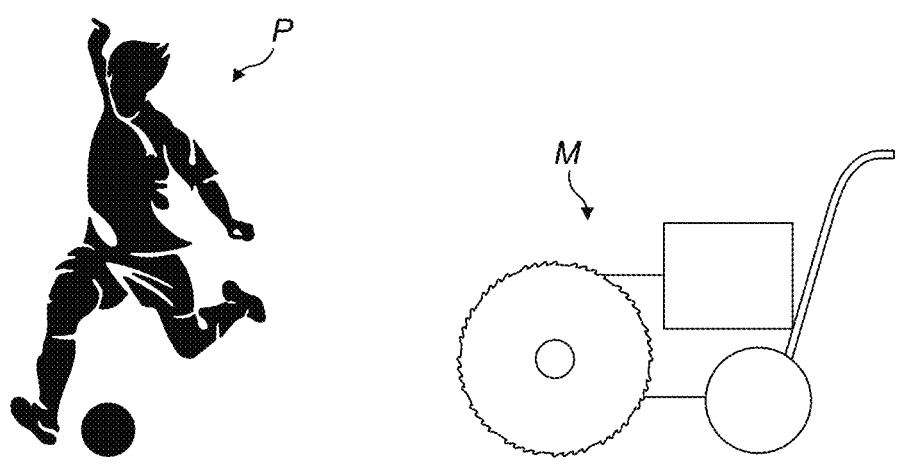
FIG. 5 shows images of a player and a maintenance machine.

The system is also able to distinguish between objects using the pitch, for example to distinguish between a first object which is player (shown schematically as P in FIG. 5), and a second object which is a maintenance machine (shown schematically as M in FIG. 5). Of course, the image shown in FIG. 5 is only from one angle but a training process using a neural network, as described below, the system is able to detect a player from various angles and positions, as well as maintenance machines and can therefore distinguish between a player using a surface (and therefore wearing out a surface) and a maintenance machine being used to perform a maintenance operation). Thus, in addition to being able to obtain density data (or heat map data where this is shown on a display) the system can distinguish between players using a pitch or other playing surface and the operation of maintenance machinery so this type of system this can be used by a user to determine that maintenance is being done at correct time intervals and after a particular amount of use.

Referring to FIG. 5, it will be seen that the pattern of pixels which will define a player (no matter what the angle or relative disposition of the player is relative to the camera) will always be different from the pattern of pixels defining a maintenance machine and therefore the system is able to distinguish between these, perhaps after a learning process. Of course, more than one type of maintenance machine and operation will be done and the system will generally be taught to recognise each type of different maintenance machine or simply to recognise that any object which is not a player (or for example a stray animal) is a maintenance machine. Many variations will be possible. The system may also discriminate other objects, eg balls, animals and so on.

Figure 6:
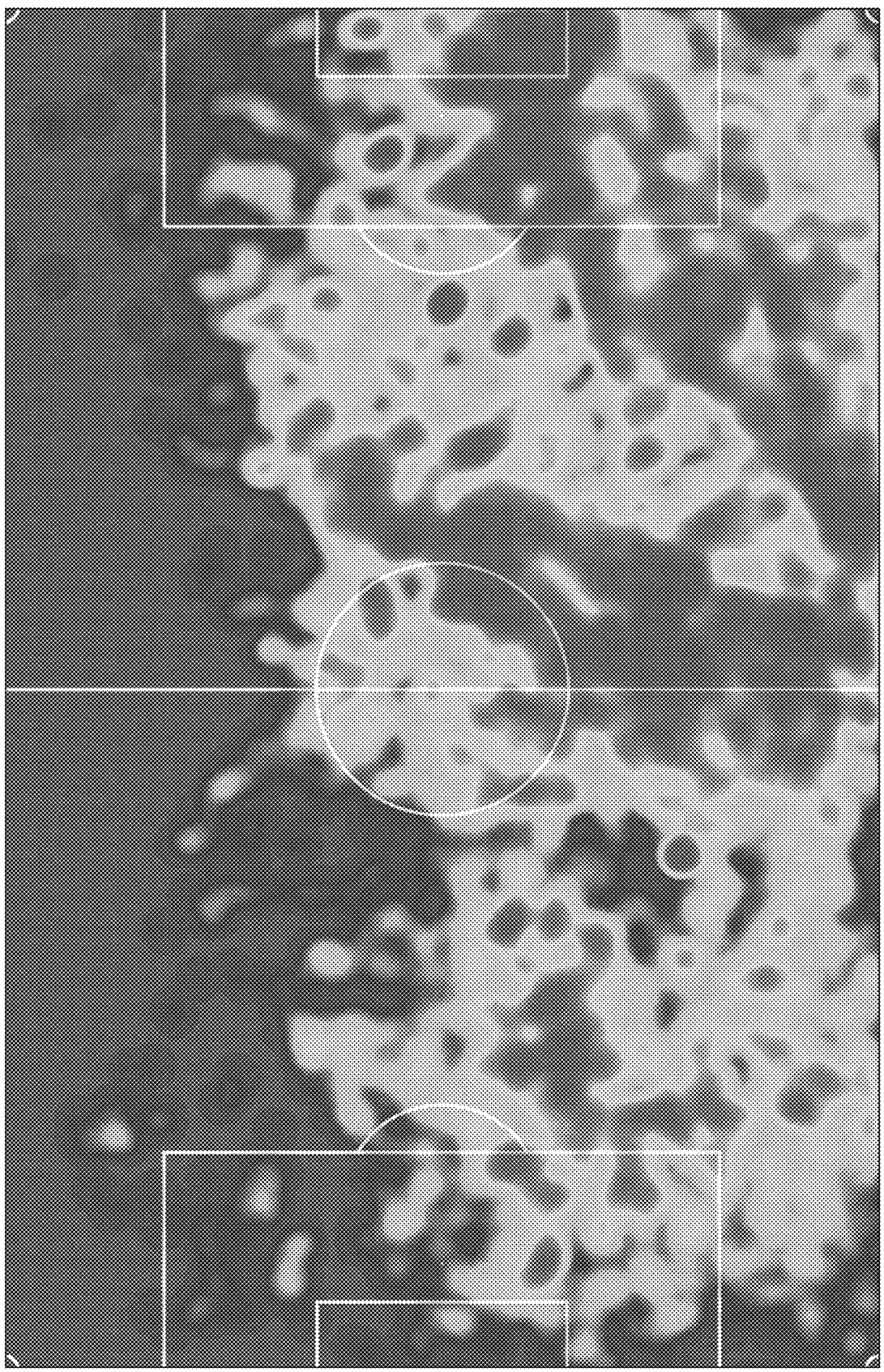
FIG. 6 shows a heat map.

FIG. 6 shows a typical heat map. This is created by obtaining data representative of the number of times a player passes over a particular area on the pitch and converting this to data representative of the density of use (ie amount of times a player passes a particular area in a certain amount of time such as fifteen minutes), so as to obtain a heat map in which more densely used areas are coloured, say red, and less densely used areas are coloured in different colours, say lighter shades of red, yellow and so on. The pitch may be divided into a grid having a number of rows and columns defined with each particular area in it defined by a particular grid value.

Figure 7:
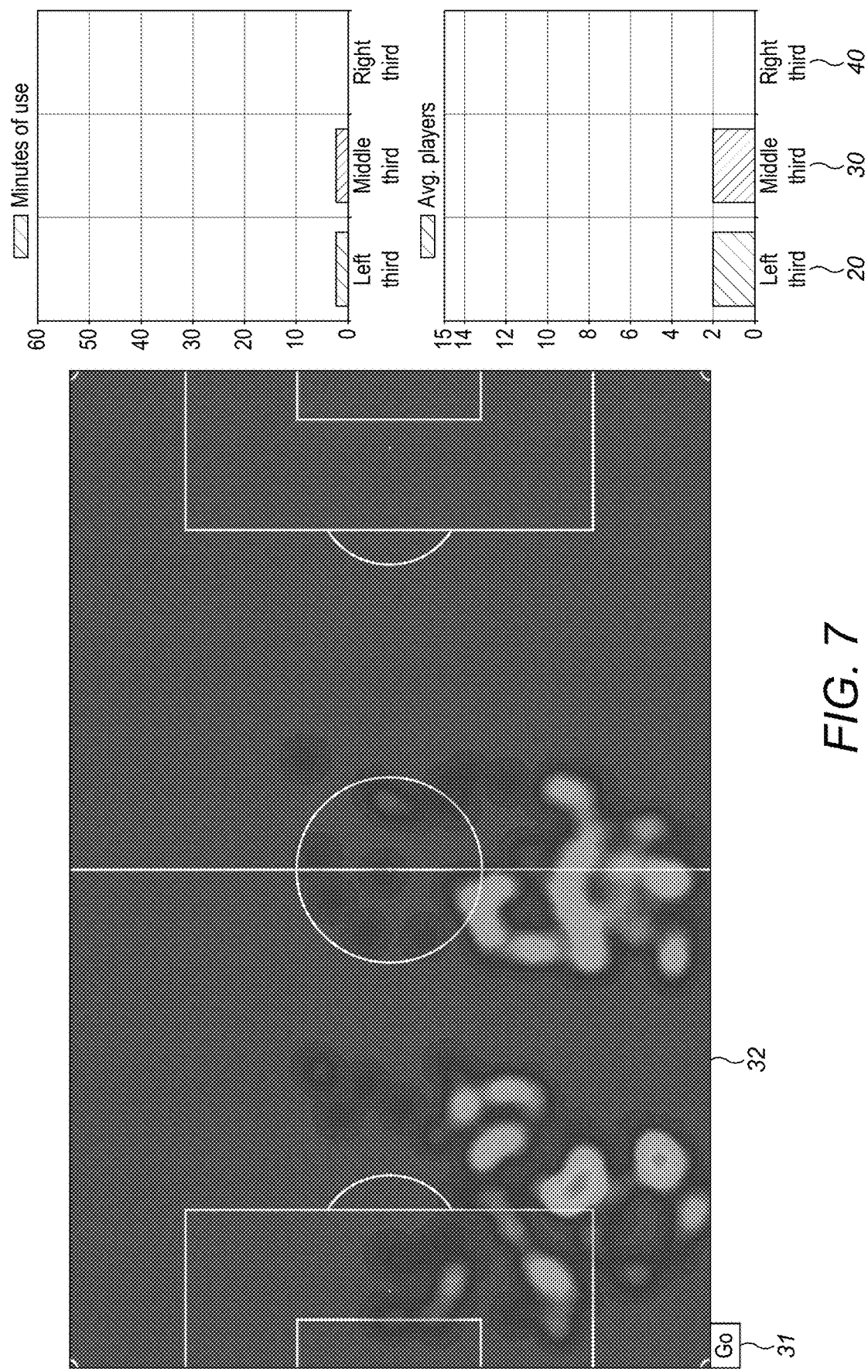
FIG. 7 shows s screen display having a heat map and an indication of use at a particular time.

FIG. 7 shows a typical screen shot that may be viewed by a user either locally, and using apparatus connected locally to the/or each camera, or at a remote monitoring station. This may include a video display showing, in real time or near real time, density of use of a pitch as a game progresses or training session and also perhaps with a bar chart showing use over a rolling time period (eg 15 minutes) of say the left third of the pitch 20, the middle third of the pitch 30 and a right third of the pitch 40.

Figure 8:
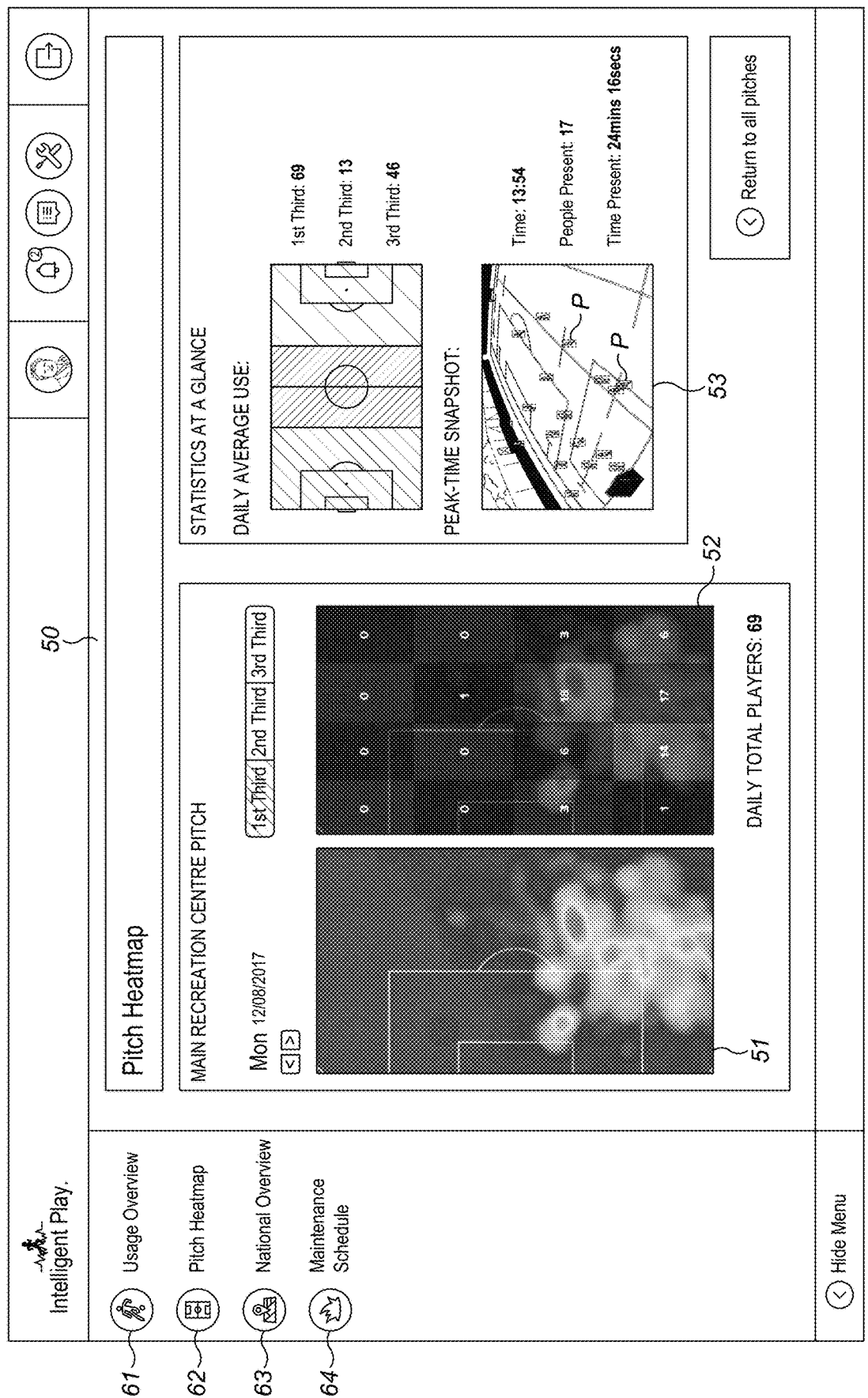
FIGS. 8 to 10 show screen shots from a dashboard.
Figure 9:
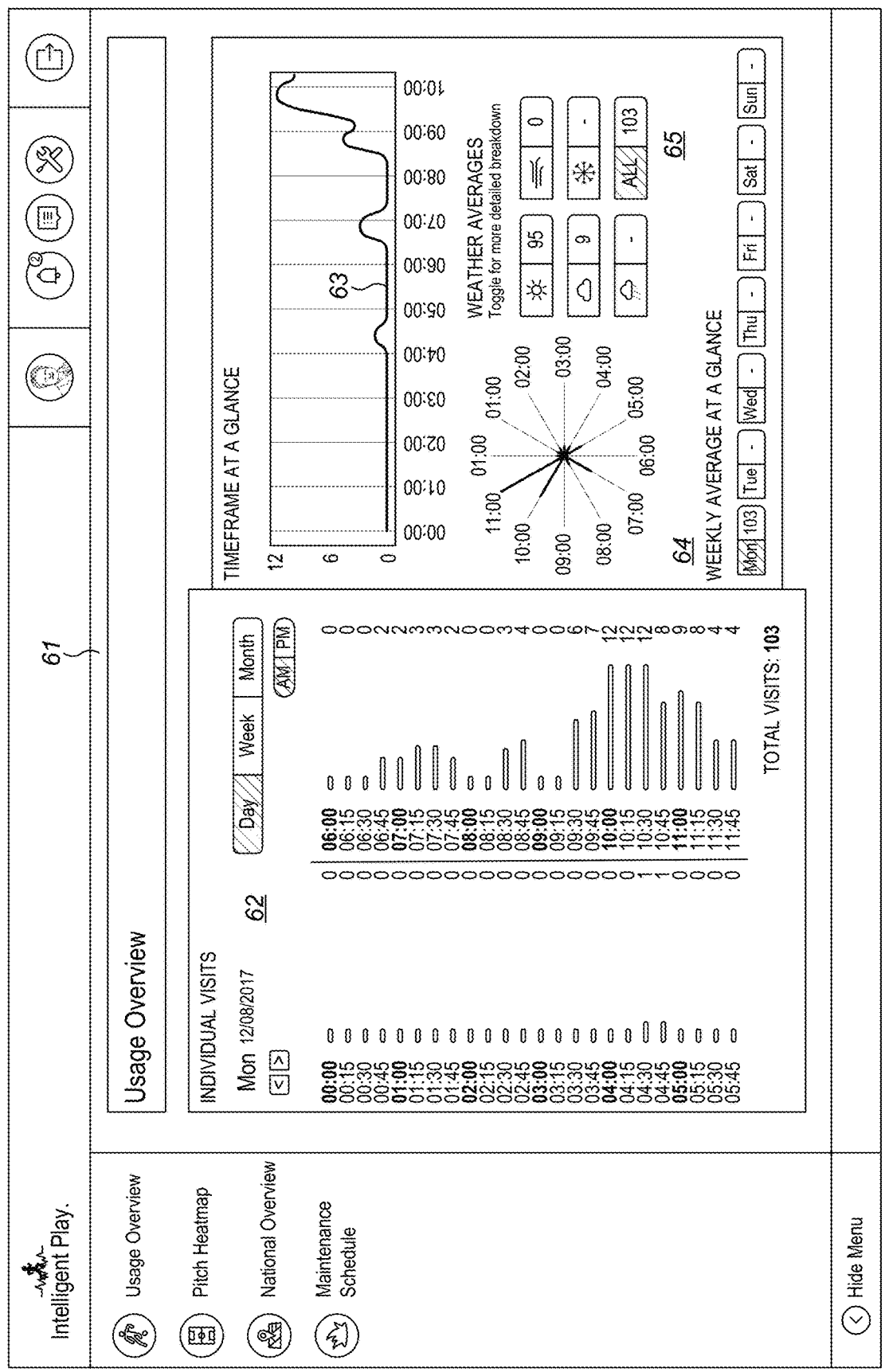
Figure 10:
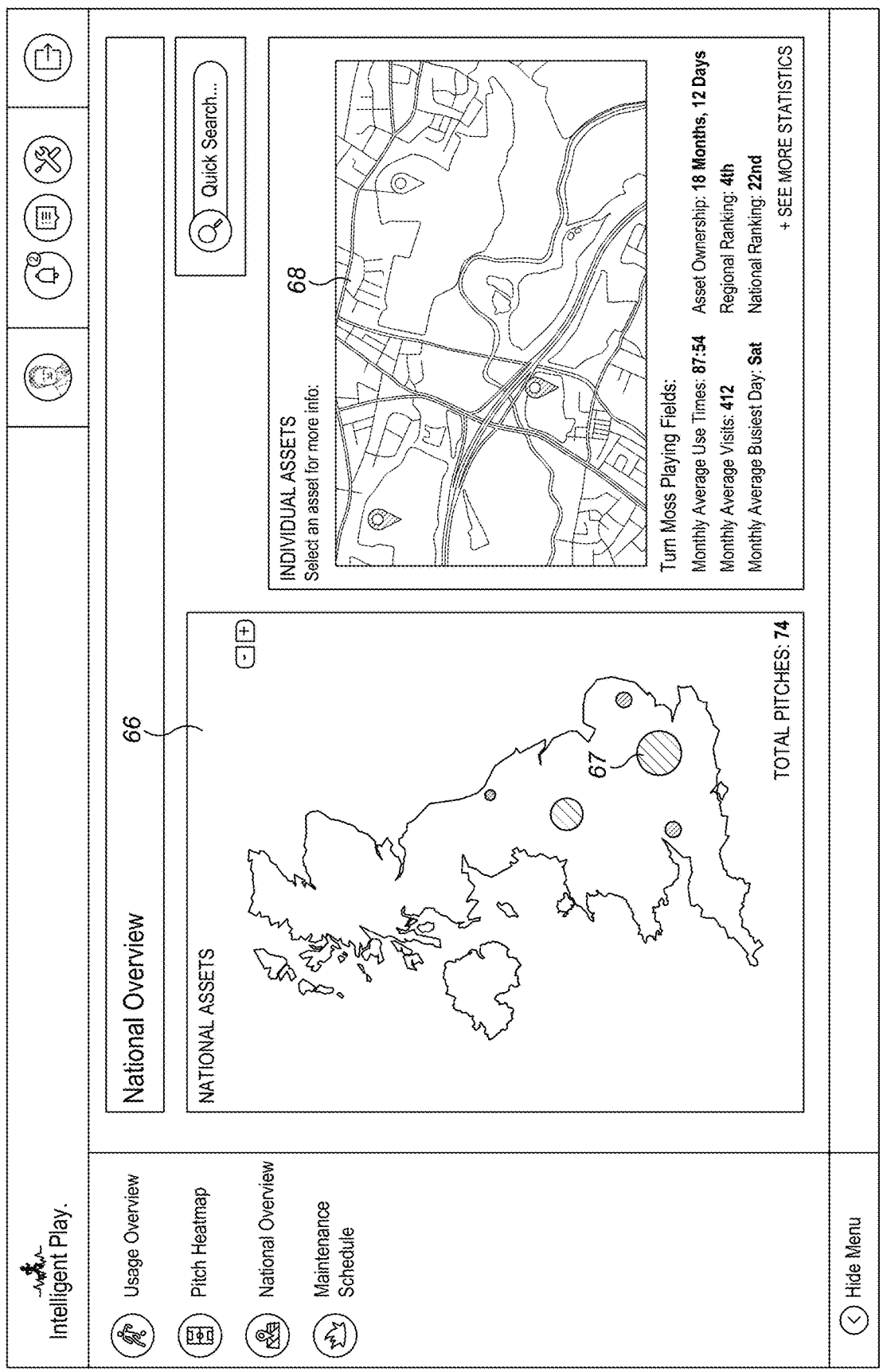

FIGS. 8 to 10 show schematic screen shots of, a "dashboard" 50 which might be viewed at a control station, provided either locally or remotely. Here pitches can be monitored. A user who may be monitoring a number of pitches can select a particular pitch to monitor and can then view heat maps of this 51, 52. This may be done in real time or may be done later using stored information. In this screen shot the viewer may also view a snapshot 53 showing players on a pitch at peak time (perhaps a time of maximum density or some other chosen time) where he views the actual image including the distinguished players P. In this screen the person monitoring can also view daily average use of that pitch (or part of a pitch in part of the display 54) and in this case has asked to view daily average use of a pitch which indicates that on average the first third of the pitch was used for 69% of the time the game of played, the second third 13% and the third 46%. Note that the total percentage may of course be more than 100% as there will be more than one player on the pitch at any time. The user can also select the pitch or pitches to monitor. The user can also obtain information relating to a usage overview 60, pitch heat map 61, a national overview illustrating statistics nationally 63 or a maintenance schedule 64.

FIG. 9 shows a usage overview screen 61 and this can display information relating to usage over a particular day (at 15 minute interviews in the day), over a week, or over a month, for example, and may include charts including density of use at any time. For example, a particular pitch may monitor at a particularly high rate between around 10 am to 10.30 am and was not used at all between midnight and 12.30 am. The individual chart shown on the left part of the FIG. 62 can be reproduced as a graph.

FIG. 10 shows all the pitches or playing surfaces the control centre may monitor (shown as "national assets") 66. This may be provided in the form of a graph which can be zoomed into to view individual zones or areas, such as the area 67. This might be linked to a map provided from a surface such as Google Map and which illustrates the locations of the specific playing surfaces being monitored, together with statistics relating to each surface. In the example shown, the "Turn Moss Playing Fields" is used for a monthly average time of 87.54 minutes and the average visit lasts 412 minutes (ie the time when a group of players is seen to be using it and therefore is considered that a visit is being made). This also shows that the monthly average busiest day is on a Saturday and illustrates (by regional rankings) how the density of use of this particular asset compares to others, both in a local region and nationally. Other information can be provided.

An important aspect is monitoring maintenance of pitches and playing surfaces. As the system can differentiate between objects such as people and maintenance apparatus, it can be used to record when a maintenance machine, such as a roller, grass-cutter or other device, passes over any region. Thus a record can be kept of maintenance. This can indicate not only that maintenance was done at a certain time/interval but also, because a record of location is present, record or indicate that density of maintenance in each particular zone or area on a surface or pitch. A heat map may be provided. The information can indicate to an operator if one zone, for example, is being maintained better (eg more frequently) than other zones. It may be for example that a groundsman moves a machine over turf in pattern which omits certain areas, which can be detected and thereby rectified.

The dashboard may have functionality to review the maintenance timing, density etc.

Figure 11:
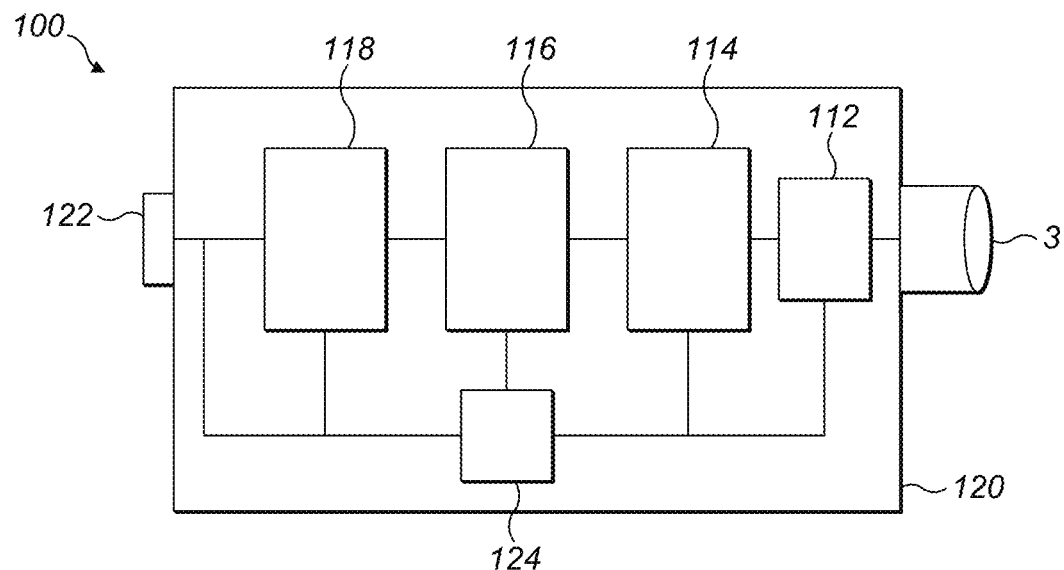
FIG. 11 shows a sensor system.

FIG. 11 shows a typical camera system that might be used in non-limiting embodiments. This might incorporate camera 3 or the camera may be a standalone camera and connected to the rest of the system. The system includes the camera 3, a video image processing unit 112, a processor 114, a memory 116, a communications unit 118, an enclosure (where the unit is a single unit) 120, a transmitter 122 and a battery or other power source 124 (or a connection to a mains supply, or a sustainable power supply such as a photovoltaic inverter, wind turbine or otherwise). A memory may also be provided.

The camera 3 may be a wide angle fish eye camera. Camera resolution may be chosen according to the field of view and the detailed required. The video processing unit 112 may be of any appropriate type and be capable of converting the images into pixel data. The processor 114 may, for example, be a Tegra X1 processor.

The communications unit 118 may be adapted to communicate by wire, by wifi, by mobile telephone, GSM, 3G or 4G telephone or other appropriate means.

The enclosure may be a waterproof one to ensure that the camera and other equipment cannot be damaged whilst in situ.

The transmitter 112 may also be waterproof and be appropriate to the communication protocol chosen for the communications unit.

When the unit is mounted upon a floodlight array, the unit may conveniently be powered by the same power source used to power the lights themselves.

Figure 12:
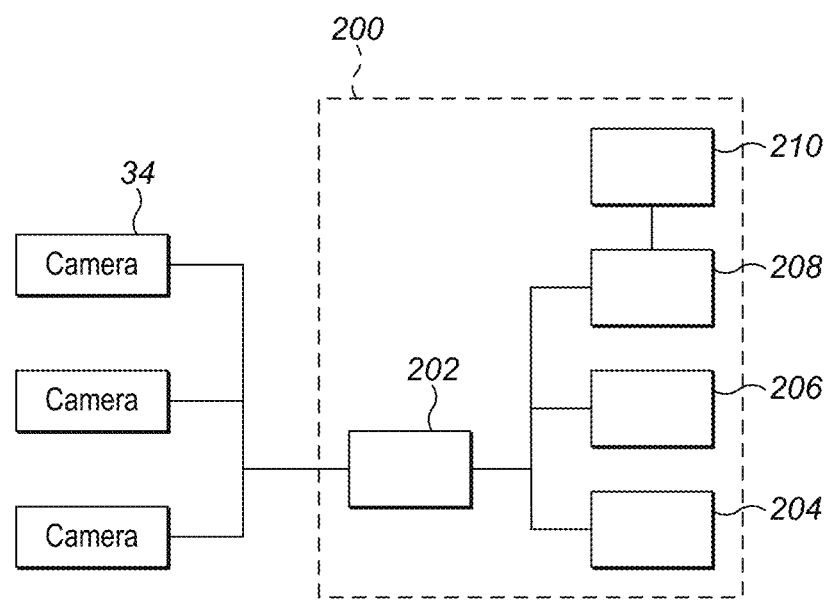
FIG. 12 shows a plurality of cameras attached to a remote monitoring station.

FIG. 12 shows a distributed arrangement in which a number of cameras 3a, 3b or camera unit (such as unit 100 in FIG. 11, which incorporates a camera) are connected to a remote monitoring station 200. This includes a server 202 connected to a system logging unit 204, a post processing unit (ie for automated reporting and providing alerts to user) 206, a data API (Application Programming Interface) 208, and a front end interface 212, which can provide the screen display as shown in FIGS. 8 to 10. A memory with also generally be provided The system may use neural networks which may be provided within the processing 112, 114 of an individual unit, or image data in its more raw form may be provided to the processor 202 of central monitoring station 200 and a neural network enabling processing to be done on groups of pixels to identify predetermined recognisable objects such as players or maintenance machines.

More typically, the neural network will be provided at the camera unit 100. After processing the data is transmitted to the remote server (or local server) 202, at the central monitoring station 200. Various types of processing may occur at the various units 204 to 210. The data API may provide real time data in computer format to software which needs it. The data may be provided to many types of software, not only that for monitoring use and maintenance but also, in software for various purposes a user, owner or manager of a playing surface or number of playing surfaces may require in order to determine how their facilities are being used and to optimise the use.

As described, the camera unit 100 is an intelligent one which can video and elitists to understand the movement of bodies in its field of view. For example, the processor 114 may use a neural network based on the Caffe framework. The Caffe network is developed by a Barclay AI Research (BAIR) and may be conveniently used, however other frameworks may be used. In order to generate outputs information from multiple pixels obtained by the camera 3a is combined and simplified over a number of layers, gradually drawing out higher level of insights about the image, starting at identifying simply features in the base image such as gradients or contours and moving onto identifying midlevel features, such as legs, wheels and so on, in order to eventually generate a top level understanding of the screen in which the information may be "I can see 10 players and they are located at positions X1, X2, X3 . . . ".

In an embodiment of the present invention a part of the process is the use of convolutional filters, which can act as part of a higher layer of the neural network described above. Mathematical convolution operations (or filters) may be used to assess one or more areas of a lower layer in turn for particular features. Each convolutional operation is tuned to one or several of these features, and scans across the layer looking for that feature. These features may identify gradients, edges or lines in lower layers; object components such as wheels, number plates, or windscreens in medium layers; or full vehicles in higher layers. These convolutional filters generate activation or feature maps, showing how strongly a convolutional filter was activated by a particular region of the lower layer, and acting as inputs into the next layer in the network. The sequential convolutional process allows the network to pick up features of increasing size, ultimately identifying full vehicles. Each time the convolution filters are used a more detailed representation of the features of an object is built up through identifying a higher-order set of features with each pass. For example, a lower convolutional layer may identify several circular gradient patterns of different colours, which is later identified in a higher layer as a wheel of a maintenance machine. In this way, a sequential understanding of the key objects in the image is constructed. When processed quickly enough, ie several frames a second, typically greater than 4 Hz, this gives real time data about the type and location of the different types of object and thus be used to generate data and graphical information concerning density of use.

Recurrent neural network architecture may be used to perform a tracking process, by adding memory to the network, in order to link sequential images together and able tracking to be done. The linkage of the sequential images may be carried out such that each object is linked with corresponding objects in subsequent or preceding claim and this helps to identify objects and give a more accurate representation of object type and location coordinates over time.

Figure 13:
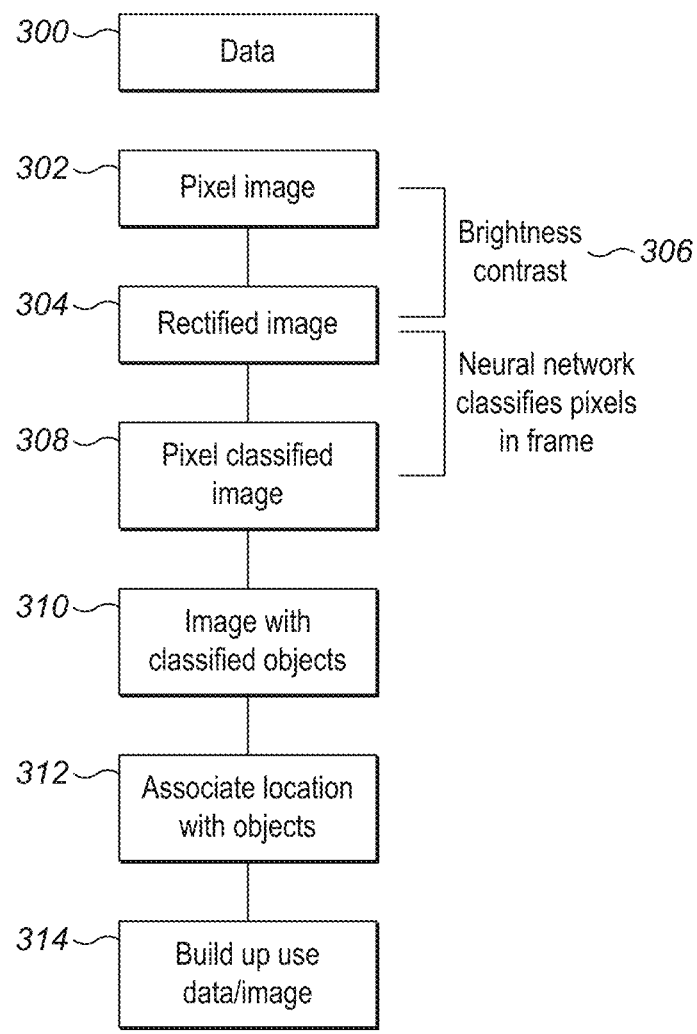
FIG. 13 shows a processing method.

Referring to FIG. 13, the processing step will now be described. Data 300 is captured on the camera 3 and this is captured on the basis of a number of single frames which together comprise a sequence and which is then used to generate a detailed pixel image 302 of each scene. This image is rectified 304 by a rectification process which adjusts brightness, contracts etc 306. Then the pixel image may be classified 306 by the neural network which classifies the pixels in the frame to obtain the pixel classified image 308.

A library of still images is used to create a machine learning model. The model is fundamentally an advanced statistical compression of the original still images, and turns the still image set (several gigabytes in size) into a streamlined function (tens to hundreds of megabytes in size), where the images were used to inform what the function looks like and does, but where the function is only a series of mathematical instructions which turn a new image into a set of labels. The system is trained by giving it many thousands of images and the corresponding labels; the model/function is derived over multiple iterations by comparing the output labels given by the function to the known labels, and adjusting the function appropriately for the next iteration, until the model converges. For example a region within the image may be identified within the model as part of a leg. A different region may be labelled as a brush of a maintenance machine. These would help the model to probabilistically identify the most likely identity of that particular object.

Once the objects in the image have been identified and classified by the neural network an image 310 can be obtained which contains the classified object (ie which indicates the different types of object which have been identified and distinguished). Each object can then be associated with a particular location, by simply determining where, in the image, the object is located, and from this, data representative of density of use can be obtained since the presence of a person at a particular location is now known, and by doing this over a time period (such as 15 minutes) a density or heat map 314 can be generated.

Figure 14:
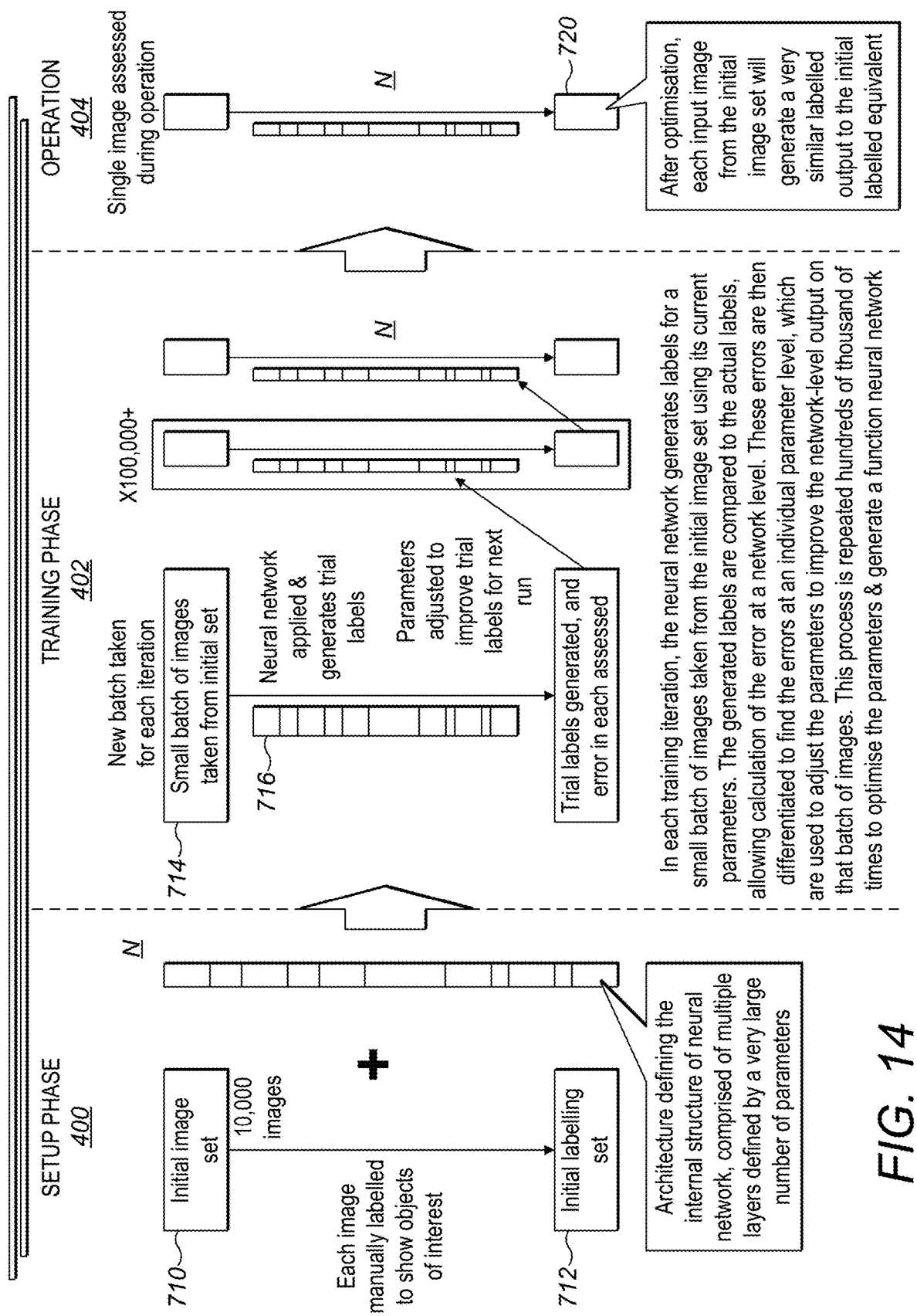
FIG. 14 shows an example of neural network processing, including set up, training and operation phases.

FIG. 14 shows the stage from a set up phase 400, a training phase 402 and an operational phase 404. Thus, the neural network operates in three main phases.

The set up phase 400 takes many images from an initial image set 710 and converts these into an initial labelling set 712. Many thousands of images might be processed at this set up stage. The conversion can be done manually labelling each image to identify objects of interest. Architecture defining the internal structure of the neural network may comprise a multiple layer structure defined by a very large number of parameters. The combination of the initial image set and the initial labelling set (in which all the objects of interest in each initial image are labelled) are inputs into the neural network end at the set up phase.

In the subsequent training phase a number of training iterations are carried out. In each training iteration a small batch of images 714 are taken from an initial set and the neural network generates trial labels for a small batch of images taken from the initial image set 714, using the current parameters 716 of the neural network as determined in the set up phase. The generated labels are compared, in step 718, with actual labels, allowing calculation of the error at a network level. That is, the system tries to apply labels and these are then compared by a user to see if they are accurate. The errors and then differentiated to improve the network level output on that batch of images. This process is then repeated many times (perhaps hundreds of thousands of times) to optimise the parameters and to generate a functional and trained neural network. The process is then repeated for other batches of images. The combination of inter and intra batch analysis results in the training neural network which accurately recognises images and attributes an accurate label or classification thereto.

Finally, in the operational phase a single image obtained by the camera 3 is input to the neural network and assessed thereby. The neural network comprises a multilayer structure which represents the initial labelling set which has been tested and trained against batches of images 714. The layers allow assessment of the image to determine an accurate label output 720 for the particular image, and thus identify an object type. The output label is very similar to the initial equivalent in the set up phase 400.

As a result, an object type can be identified by the above described process and used by the remainder of the system to generate the array of objects and location coordinates. Note that object type is not necessarily a restrictive term but may be used to identify the nature of the object so that specific types of objects can be identified and used by the system. Thus an object could be a player, a ball, a whole maintenance machine or merely part of a maintenance machine such as brush or handle bar. The object type can be labelled by the system in any appropriate manner.

Thus, different type of object can also be identified in the same images.

Note that object recognition, distinguishing and labelling may be done by many different techniques, not only the neural network technique described. Generally methods will involve an initial pixel image being obtained and then the pixel being analysed to distinguished objects. This may be done by pattern recognition or by many other techniques.

The image capture device may be incorporated into floodlights during manufacture, for example.

The invention claimed is:

1. A playing surface monitoring system, comprising a playing surface; an image capture unit arranged for capturing images of at least part of the playing surface and persons or objects thereon; processing means for detecting said persons or objects and their relative location on the playing surface; means for discriminating between persons using the playing surface and objects used for maintenance of the playing surface, and means for determining how much the playing surface or one or more parts thereof is used or maintenance operations of the playing surface are being performed over a period of time, based on the determined information, to determine whether the playing surface is being correctly maintained.

2. The system as claimed in claim 1 including means for presenting the determined information to a local or remote user.

3. The system as claimed in claim 1 wherein the processing means is configured to monitor how much the playing surface or one or more parts thereof is used by persons and maintenance operations formed by maintenance apparatus and to distinguish between such use data and maintenance data.

4. The system as claimed in claim 1 wherein pixel data is obtained and comprising a processing means configured to analyse pixel data in order to distinguish between persons and other objects.

5. The system as claimed in claim 1 wherein the image capture unit is a camera.

6. The system as claimed in claim 1 wherein the image capture unit comprises means for capturing a pixel image of persons or other devices in one or more predetermined areas of the playing surface; means for identifying and classifying the or each object within the image via neural network processing using the pixel data to generate an object type; determining location coordinates for the or each object type and creating an array of object type and location coordinates over time to thereby monitor use and/or maintenance of the/or each monitored part of the playing surface over time.

7. A method of monitoring use and maintenance of a playing surface system comprising a playing surface, the method comprising:
   capturing images of at least part of the playing surface and persons or objects thereon;
   detecting said persons or objects and their relative location on the playing surface;
   discriminating between persons using the playing surface and objects used for maintenance of the playing surface;
   based on the determined information, determining how much the playing surface or one or more parts thereof is used or maintenance operations of the playing surface are being performed over a period of time, to determine whether the playing surface is being correctly maintained; and
   identifying and classifying the persons or each object within the image via neural network processing using the pixel data to generate an object type,
wherein the neural network is arranged for use in a set-up phase, a training phase and an operation phase.

8. The method as claimed in claim 7, wherein the set-up phase includes inputting an initial set of images and labelling each or a selection of these images; and the training phase comprises using the capture unit to obtain one or more images, and applying the neural network to generate one or more trial labels to objects found in the images; checking the assigned label for errors and using errors to adjust parameters set in the neural network and then repeating the labelling steps one or a plurality of times to reduce errors.

9. The method as claimed in claim 8 wherein in the training phase the labelling and error detect and parameter adjusting steps are repeated a plurality of times until a desired level of confidence is achieved.

10. The method as claimed in claim 9 wherein during a third operation phase of the neural network a single image is obtained from the image capture means, is applied to the neural network and the neural network applies labels to each of set of pixels it considers to be an object.

11. The method as claimed in claim 8 wherein individual pixels are classified by the neural network processor and are grouped to form a classified object type.

12. The method according to claim 11 wherein the classified pixels are generated using an initial library of still images to create a machine learning model which is compared with each pixel to thereby classify the pixel.

13. The method as claimed in claim 7 wherein a plurality of image capture devices are provided to monitor parts of a playing surface, a plurality of playing surfaces or a plurality of playing surfaces at a remote location, each image capture device being associated with a means for transmitting data to a central monitoring station.

14. The method as claimed in claim 13 wherein the central monitoring data receives data from or each image capture unit and is provided with software for analysing and/or displaying this data to a user.

15. The method as claimed in claim 13 wherein the/or each capture unit communicates with the central control unit to a communications link.

\* \* \* \* \*